United States Patent [19]
Roberts et al.

[11] Patent Number: 6,055,853
[45] Date of Patent: May 2, 2000

[54] INSTRUMENTED DATA ACQUISITION SYSTEM AND STEERING WHEEL MONITOR FOR VEHICLE STEERING SYSTEM

[75] Inventors: Donald W. Roberts, Fort Wayne; Donald L. Murphy, Decatur; W. Dennis Mann, Roanoke; Edward M. DeWitt, Fort Wayne, all of Ind.

[73] Assignee: Navistar International Transportation Corp, Chicago, Ill.

[21] Appl. No.: 08/967,510

[22] Filed: Nov. 11, 1997

[51] Int. Cl.[7] .................................................. G01M 19/00
[52] U.S. Cl. ............................................................ 73/118.1
[58] Field of Search ........................... 73/118.1, 862.541; 340/438, 439

[56] References Cited

U.S. PATENT DOCUMENTS 3,673,561  6/1972  Bronstein .
4,696,365  9/1987  Ishimori et al. .
5,027,648  7/1991  Filleau .

*Primary Examiner*—Robert Raevis
*Attorney, Agent, or Firm*—Jeffrey P. Calfa; Dennis Kelly Sullivan

[57] ABSTRACT

The apparatus for monitoring and recording operational characteristics of heavy or medium duty vehicle power steering systems and a method of using same in testing the operation and response of a steering system in a heavy or medium duty truck including school buses. In its most basic form, the apparatus is comprised of a data collection computer means for collecting data input and displaying output data, a steering wheel rotation measuring assembly, a driver side pitman arm angle measuring device, a passenger side wheel turn angle measuring device, and a driver side wheel turn angle measuring device. The apparatus is generally installed on a temporary basis for troubleshooting and analysis, however, the steering wheel rotation measuring assembly may be permanently installed on a vehicle to give the driver an accurate indication of steering wheel turns or an alarm when the wheel has been turned to its maximum value.

16 Claims, 4 Drawing Sheets

INSTRUMENTED DATA ACQUISITION SYSTEM AND STEERING WHEEL MONITOR FOR VEHICLE STEERING SYSTEM

BACKGROUND OF THE INVENTION

The present invention relates to an instrumented data acquisition system for monitoring and recording operational characteristics of heavy or medium duty vehicle power steering systems and a method of using same in testing the operation and response of a steering system in a heavy or medium duty truck including school buses. More specifically, the apparatus allows a technician to measure all steering system parameters necessary to test functionality. The instrumented data acquisition system is the aggregate of sensing devices which may be installed in its entirety or specific parts to monitor steering system performance. It is expected the instrumented data acquisition system with all its parts will be a diagnostic tool which will be removed from the vehicle at the completion of testing and trouble shooting. One sub-component of the instrumented data acquisition tool that may be permanently installed on a vehicle is the steering wheel rotation measuring assembly. The steering wheel rotation measuring assembly may be installed to obtain an accurate signal directly representing the amount of steering wheel turning by an operator. This signal could either be recorded on paper or in a computer hard drive, displayed in real time on the dashboard of the vehicle, or used to provide a warning alarm to a vehicle driver.

THE PRIOR ART

Heretofore, analysis of vehicle steering systems has been limited to evaluation of system pump operational parameters and inaccurate and cumbersome measurements of steering wheel rotation. Even these parameters were not measured at the same time and analyzed together. The modem heavy and medium duty vehicle power steering system is complex with multiple interconnecting components. Primary components of the these power steering systems include the steering wheel, the steering column, the power steering gear, the pitman arm, the drag link, the steering arm, the tie rod, the wheels, the axle, the power steering reservoir, and the power steering fluid pump. Dual gear steering systems have a slave power steering gear and an additional pitman arm. Accurate measurement of the operation of the primary components of this system together and analysis of the data in the aggregate would provide manufacturing and maintenance technicians with valuable insight into steering system operation. To date, however, an instrumented data acquisition system for steering systems which measures the operation of all of the steering system primary components and feeds this information to a computer for compilation, display and analysis has not been proposed.

Another limitation in the prior art was the inability to obtain accurate measurements of steering wheel turns. The most common method was to use a potentiometer mounted to a small wheel with a diameter smaller than the diameter of the steering shaft to be measured. The small wheel was held against a wheel on the steering column housing. Friction caused the two wheels to move when the steering wheel was turned. Sometimes the small wheel would slip out of firm contact with the wheel on the steering column causing inaccuracies in the data. A second limitation of the small wheel method of measurement was the difference in the small wheel's diameter versus that of the wheel on the steering column. Due to this difference, the wheel to wheel ratio was not one to one and the data had to be manipulated prior to analysis to account for the difference.

SUMMARY OF THE INVENTION

Accordingly, a primary object of the apparatus and method of the present invention is to provide technicians, engineers and vehicle maintenance personnel with all of the important operating parameters for the primary components of a vehicle power steering system so that steering systems in vehicles under development and already developed may be completely analyzed for current or potential problems or anomalies. The inclusion of all the steering system primary components into the analysis will reduce time in solving problems in production testing and in solving consumer problems in neighborhood repair facilities.

A second object of the invention is to utilize continuous turn rotary potentiometers to measure pitman arm rotation and tire turn angle. The rotary potentiometers will produce voltage signals dependent on the amount of rotation of the rotary potentiometer. At zero degrees rotation, the potentiometers produce a zero (0) volt signal; at 360 degrees rotation, the potentiometers produce a five (5) volt signal; and at 180 degrees rotation, the potentiometers produce a two point five (2.5) volt signal. The data acquisition system will translate the voltage into a rotation angle readout. This use of rotary potentiometers provides accurate measurements of pitman arm rotation and tire turn angles. Measurement of pitman arm rotation allows analysis of the steering gear(s). When the vehicle is moving straight down the road, and steering actions are minimal, the gear movement and therefore pitman arm movement, should be minimal. Measurement of pitman arm movements with potentiometers will allow for analysis of the internal movements of the gear and also for a determination of whether movement is excessive.

A third object of the invention is to utilize a continuous turn rotary potentiometer in conjunction with two timing pulleys and a timing belt to provide an accurate measurement of degrees of rotation of the steering wheel. One pulley, the shaft pulley is mounted on the intermediate steering shaft, while the other pulley, the bracket pulley is mounted to a bracket which is rigidly attached to the vehicle's frame. The continuous rotary potentiometer is connected to the bracket pulley. The timing belt is attached between the shaft pulley and the bracket pulley so that rotation of the intermediate steering shaft causes the rotary potentiometer to rotate and hence generate a voltage signal directly related to steering wheel and intermediate steering shaft movement. The two pulleys are of equal outer diameter, therefore one rotation of the steering wheel is equivalent to one rotation of the intermediate steering shaft which is equivalent to one turn of the wheel pulley which is equivalent to one rotation of the bracket pulley which is equivalent to one rotation of the rotary potentiometer. The data acquisition system translates the voltage signal from the rotary potentiometer into a steering shaft turn readout. The timing belt and pulley method of measuring steering wheel turns may also be used to monitor driver performance. The rotary potentiometer voltage output could be provided to a recorder for later analysis of performance or to a dash board display to provide a vehicle driver with real time indications of wheel shaft rotation and movement.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
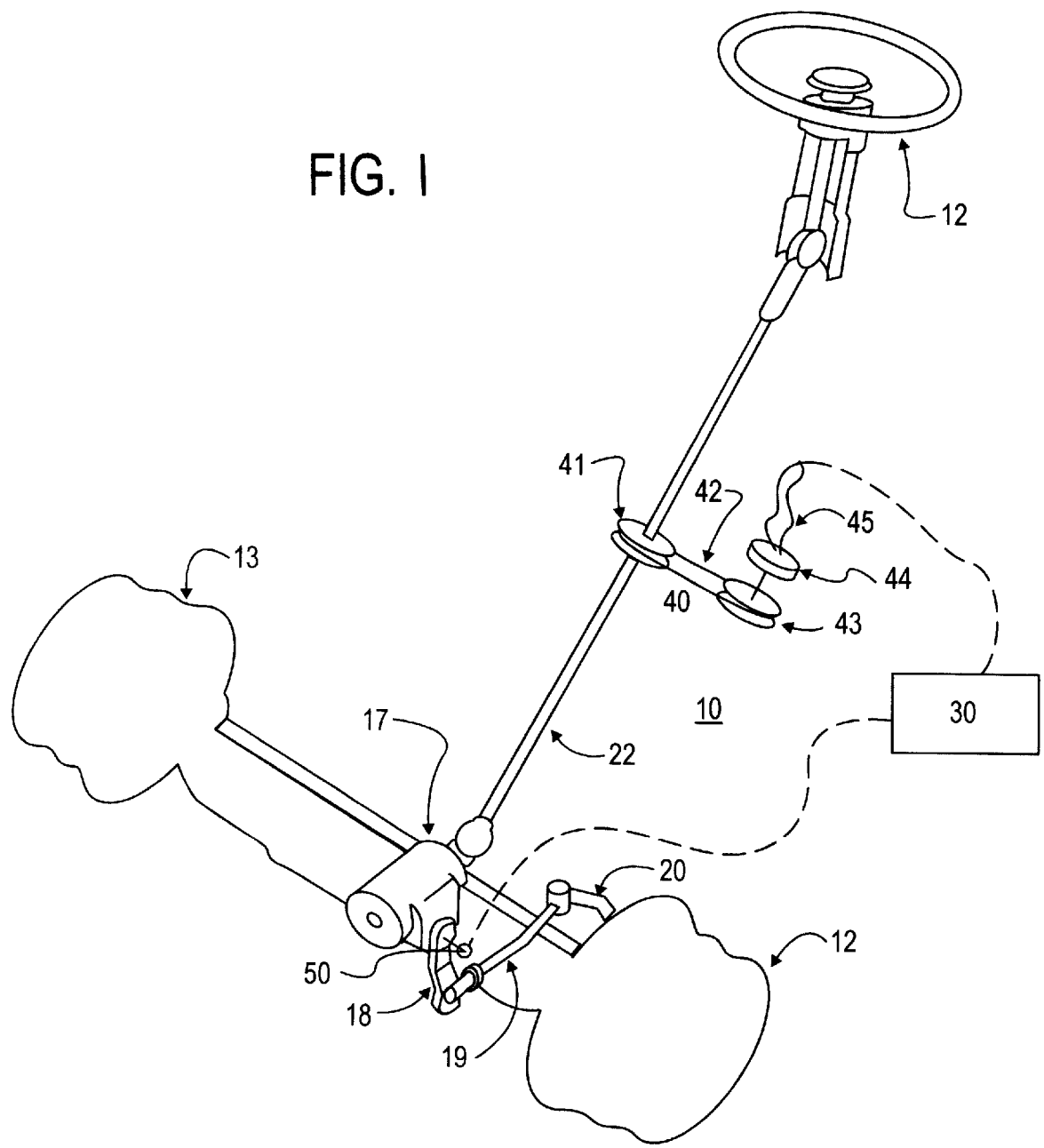
FIG. 1 is a schematic drawing of a mobile vehicle steering system incorporating one embodiment of the invention.
Figure 2:
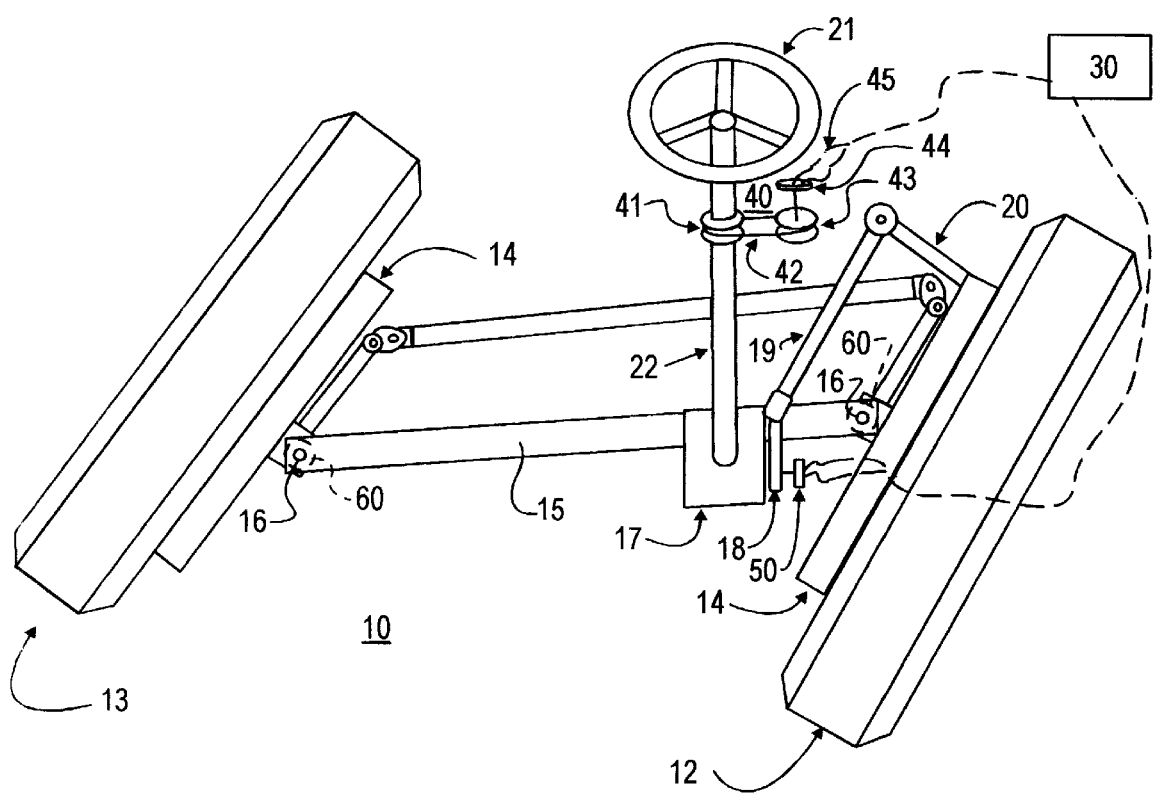
FIG. 2 is a top view of the mobile vehicle steering system of FIG. 1.
Figure 3:
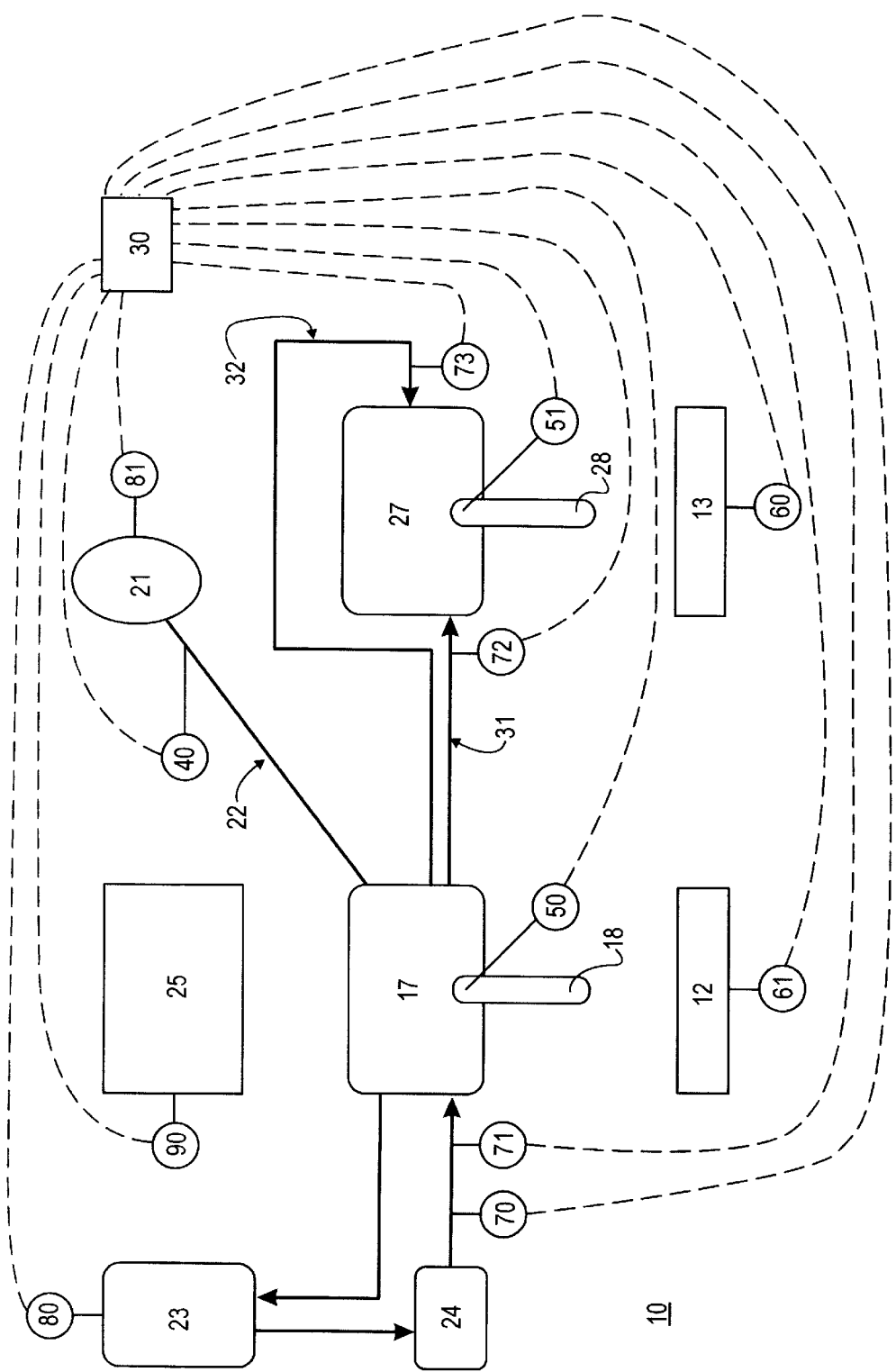
FIG. 3 is a schematic block diagram illustrating the instrumented data acquisition system for steering installed on the power steering system of the mobile vehicle of FIG. 1.

Referring now to the drawings in greater detail there is illustrated in FIGS. 1 to 3, a vehicle steering system 10 of a vehicle (not shown). A driver side wheel 12 and a passenger side wheel 13 are shown rotatably mounted on wheel spindles 14 pivotably mounted to opposite ends of an axle beam 15 through king pins 16. A steering gear 17 rotates a pitman arm 18 pivotably connected to a drag link 19 in turn pivotably connected to a steering arm 20 secured to the spindle 14 of the driver side wheel 12 to control movement of the driver side wheel 12. The steering gear 17 is operated by a steering wheel 21 through an intermediate steering shaft 22. A power steering reservoir 23 is engaged to a power steering fluid pump 24 to supply hydraulic fluid to the steering gear 17. The steering system 10 is a mechanical steering system and the power to operate the steering system 10 comes from the operator. The vehicle has an engine 25 for making the vehicle self propelled.

Where the steering system 10 is a dual-gear system, there is a slave power steering gear 27 for controlling the passenger side wheel 13 via a passenger side pitman arm 28. The slave power steering gear 27 is engaged to the steering gear 17 via a left side pressure line 31 and right side pressure line 32. Pressure is applied to the slave power steering gear 27 from the steering gear 17 to the left side pressure line 31 for left turns of the passenger side wheel 13 and pressure is applied to the slave power steering gear 27 from the steering gear 17 to the right side pressure line 32 for right turns of the passenger side wheel 13.

An instrumented data acquisition system (subparts shown on FIGS. 1, 2, and 3) can be installed on the steering system 10 to monitor the performance and analyze for the source of any problems. In its most basic form, the instrumented data acquisition system is comprised of: a data collection computer means 30 for collecting data input and displaying output data, a steering wheel rotation measuring assembly 40; a driver side pitman arm angle measuring device 50; a passenger side wheel turn angle measuring device 60; and a driver side wheel turn angle measuring device 61. Each measuring device is engaged to the data collection computer means 30 to provide electrical signals reflecting the particular measured parameters.

The steering wheel rotation measuring assembly 40 is a device designed to remove the inaccuracies of previous devices by incorporating two pulleys with equal outer working diameters, a steering shaft pulley 41 which may be engaged around the intermediate steering shaft 22 and a vehicle frame mounted bracket pulley 43 which may be mounted to a frame rail (not shown) on the vehicle. A timing belt 42 is attached around and between the bracket pulley 43 and the shaft pulley 41 so that one rotation of the intermediate steering shaft 22 results in on turn of the bracket pulley. A continuous turn rotary potentiometer 44 is engaged to the bracket pulley 43 such that one turn of the bracket pulley 43 results in one turn of the bracket pulley rotary potentiometer 44. The bracket pulley rotary potentiometer 44 is functionally engaged by wiring connectors 45 to provide an electrical signal reflecting the amount of steering wheel rotation to the data collection computer means 30. This equal sizing of the outer diameter of the shaft pulley 41 and bracket pulley 43 results in a one to one ratio of turns of each pulley removing an extra complication in prior art calculations.

The driver side pitman arm measuring device 50 is a continuous turn rotary potentiometer which may be engaged to the driver side pitman arm 18 to measure driver side pitman arm 18 rotation. The driver side pitman arm measuring device 50 is functionally engaged to provide an electrical signal reflecting the amount of driver side pitman arm 18 rotation to the data collection computer means 30.

The passenger side wheel turn angle measuring device 60 and the driver side wheel turn angle measuring device 61 are each continuous rotary potentiometers which may be attached to underside of the king pins 16 for the passenger side wheel 13 and the driver side wheel 12, respectively, to measure wheel turn angles. The passenger side wheel turn angle measuring device 60 and the driver side wheel turn angle measuring device 61 are functionally engaged to the data collection computer means 30 to provide electrical signals reflecting the relative positions of the passenger side wheel 13 and the driver side wheel 12, respectively.

In order to provide the instrumented data acquisition system with vital information concerning the power steering fluid pump 24, a pressure transducer 71 for measuring pump outlet pressure and a flow meter 70 for measuring system flow rate are provided and may be engaged to measure these pump parameters. The fluid pump pressure transducer 71 and fluid pump flow meter 70 are functionally engaged to the data collection computer means 30 to provide electrical signals reflecting the measured parameters. Additionally, a thermocouple 80 is provided to be installed to the power steering reservoir 23 to measure liquid temperature in the power steering reservoir. The fluid temperature will reflect the amount of work being performed by the steering gear 17. The higher the temperature, the more work performed in the system which may be an early indicator of a performance problem. The thermocouple 80 is also functionally engaged to the data collection computer means 30 to provide electrical signals reflecting the measured parameter.

Another important indicator of steering system 10 performance is a measurement of how much work a driver needs to perform in order turn the steering wheel 21. A load cell 81 is provided which may be engaged to the steering wheel 21 to measure the torque applied by the driver. An alternative way to view this measurement is that it is the amount of counter resistance the steering system 10 applies when the driver rotates the steering wheel 21. The load cell 81 is functionally engaged to the data collection computer means 30 to provide electrical signals reflecting the measured parameter.

The final piece of data which may be measured by the instrumented data acquisition system is engine speed. A speed transducer 90 may be engaged to the engine 25 to measure engine speed. This parameter is important to show the relationship of steering system 10 performance to engine 25 operation.

In the preferred embodiment, all of the above mentioned continuous turn rotary potentiometers are Spectrol Model 132-0-0-103 rotary potentiometers.

Where the steering system 10 is a dual-gear system, the instrumented data acquisition system will be capable of monitoring additional parameters. A pressure transducer 72 will be provided which may be engaged to measure pressure in the left side pressure line 31 connected to the slave power steering gear 27. An additional pressure transducer 73 will be provided which may be engaged to measure pressure in the right side pressure line 32 connected to the slave power steering gear 27. An additional continuous turn rotary potentiometer 51 will be provided which may be engaged to the passenger side pitman arm 28 to measure rotation. In the preferred embodiment, the passenger side pitman arm rotary potentiometer 51 is also a Spectrol Model 132-0-0-103 rotary potentiometer. The additional parameters are necessary to be measured in the a dual-gear system due to the interaction between the steering gear 17 and the slave power steering gear 27.

Figure 4:
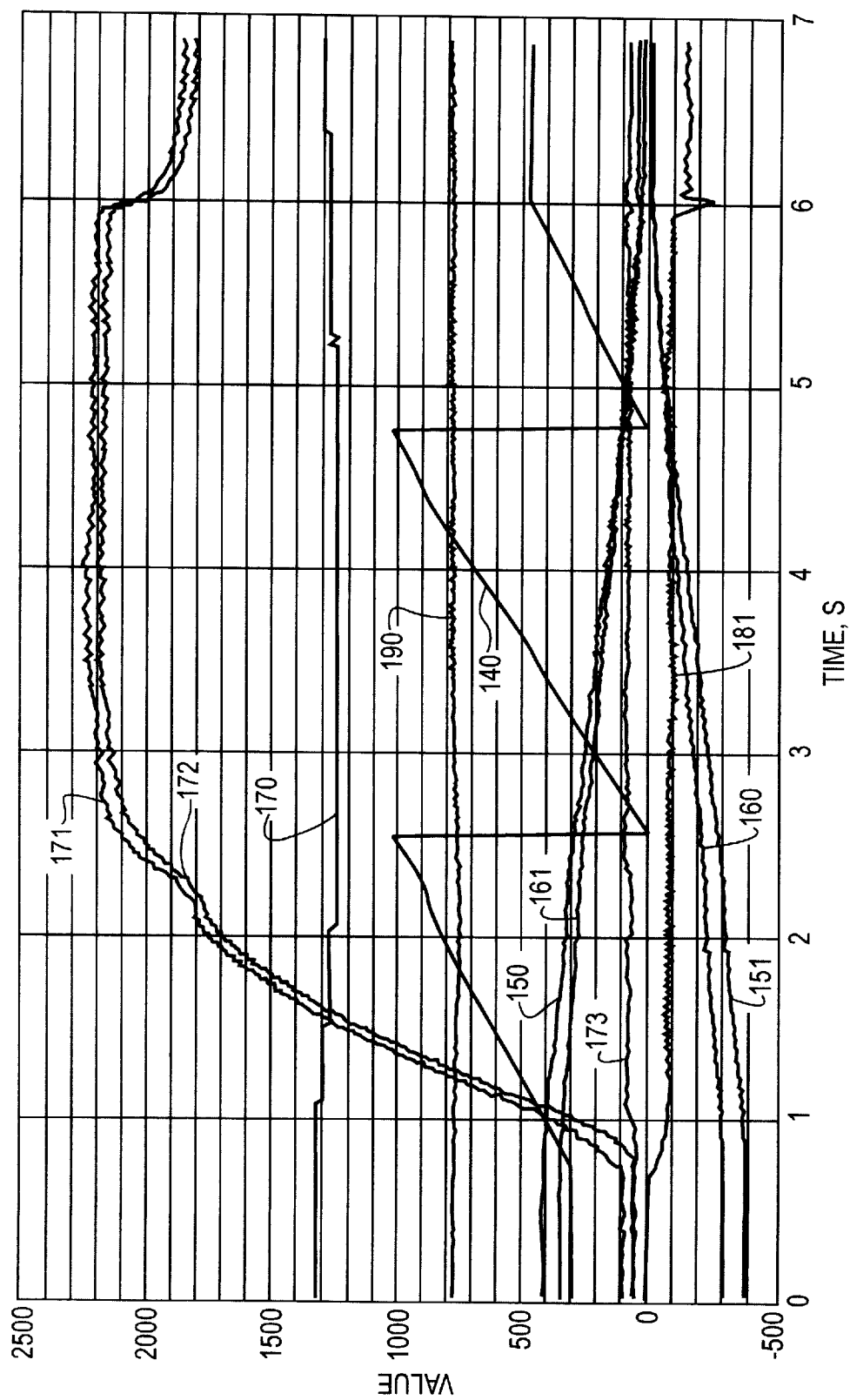
FIG. 4 is a sample output graph from the instrumented data acquisition system for steering of FIGS. 1 and 2.

In use the instrumented data acquisition system is installed on a vehicle in a factory or vehicle dealership or local garage. The equipment operator use the data collection computer means 30 to measure vehicle parameters during dry parking turns in which the vehicle has no forward motion and also while the vehicle is being driven. A sample output chart of the data collection computer means 30 for a left turn maneuver of a dual steering gear vehicle is shown in FIG. 4. Line 140 of FIG. 4 reflects steering wheel 21 turns. In this case approximately two and one half turns were required as illustrated by the approximately two and one half upwards spikes of line 140. Lines 150 and 151 reflect left pitman arm 18 and right pitman arm 28 rotation, respectively. Although, Lines 150 and 151 appear to be mirror images of one another, they are not. This is due to the differences in between the gears and the Ackerman steering geometry. Lines 161 and 160 reflect the turning of the driver side wheel 12 and the passenger side wheel 13, respectively. While lines 161 and 160 appear to be mirror images of each other, this will not necessarily always be true as wheel cuts may vary and Ackerman geometry may also cause changes. Lines 150 and 151 should normally follow Lines 161 and 160 respectively due the physical relationship of the pitman arms to the wheels. Line 190 reflects engine speed which was constant for the example shown in FIG. 4. Line 171 reflects power steering fluid pump 24 outlet pressure. As would be expected Line 172, which reflects pressure in the left side pressure line 31 connected to the slave power steering gear 27, follows the pump outlet pressure represented by Line 171 for a left turn maneuver. Line 173 reflects pressure in the right side pressure line 32 connected to the slave power steering gear 27 and for this left turning maneuver, as expected is relatively constant. The drivers efforts or the required torque in turning the steering wheel 21 are reflected by Line 181 and are slightly increasing in absolute value through the turning as would be expected. This is the measurement of efforts which are typically higher for a right hand turn for left side drive vehicles and are in no way related to the efforts in one direction or the other. Line 170 reflects system flow from the power steering fluid pump 24. In the initial part of the maneuver where pump outlet pressure increased as indicated by Line 171, system flow as indicated by Line 170 decreased as expected. When outlet pressure as indicated by Line 171 became steady at the end of the first rotation of the steering wheel 21 and shown by Line 140, system fluid flow as indicated by Line 170 became steady. An engineer or garage technician will analyze the output charts and graphs obtained from the data collection computer means 30, observing the operation and interrelationships between the primary components of the steering system 10. The analysis will include comparing the output charts and graphs with normal maneuvers such as shown in FIG. 4.

The steering wheel rotation measuring assembly 40 may be permanently installed in the vehicle as described above. An electrical signal reflecting steering wheel rotation would be provided to a data collecting and displaying means (not shown). In permanent installation in a vehicle, it is expected that data could be recorded or be provided as a real time dashboard display (not shown) for the driver. The dashboard display 95 would illustrate the amount of steering wheel rotation from a zero forward direction position. It is envisioned that an alarm could be provided to warn the driver that the steering wheel 21 has been turned to its maximum value, thereby preventing damage or stress to the steering system 10.

As described above the instrumented data acquisition system, the method of using same and the steering wheel rotation measuring assembly 40 of the present invention provide a number of advantages, some of which have been described above, and others of which are inherent in the invention. Also, modifications may be proposed to the instrumented data acquisition system, and method and the steering wheel rotation measuring assembly 40 without departing from the teachings herein. Accordingly, the scope of the invention is only to be limited as necessitated by the accompanying claims.

What is claimed is:

1. An instrumented data acquisition system for monitoring performance of a power steering system of a mobile vehicle with an engine and a frame which includes a driver side wheel and a passenger side wheel each mounted on wheel spindles pivotably mounted to opposite ends of an axle through king pins, a driver operated steering wheel connected to a steering gear through an intermediate steering shaft, a driver side pitman arm functionally engaged to the steering gear so as to pivotably rotate upon intermediate steering shaft rotation and connected to a drag link in turn pivotably connected to a steering arm secured to the driver side wheel spindle to control movement of the driver side wheel, and a power steering reservoir engaged to a power steering fluid pump for supplying fluid to the steering gear, comprising:

(a) a data collection computer means for collecting data input and displaying output data;

(b) a steering wheel rotation measuring assembly;

(c) a driver side pitman arm angle measuring device;

(d) a passenger side wheel turn angle measuring device; and (e) a driver side wheel turn angle measuring device.

2. The instrumented data acquisition system of claim 1, wherein said steering wheel rotation measuring assembly is comprised of:

(a) a shaft pulley which may be engaged around the intermediate steering shaft;

(b) a bracket pulley of equal outer diameter as said shaft pulley and which may be mounted via a bracket to the frame of the vehicle;

(c) a timing belt which may be attached around said shaft pulley and said bracket pulley such that one rotation of the intermediate steering shaft results in one turn of said bracket pulley;

(d) a continuous turn rotary potentiometer engaged to said bracket pulley such that one turn of said bracket pulley results in one turn of said bracket pulley rotary potentiometer; and (e) said bracket pulley rotary potentiometer is functionally engaged to said data collection computer means to provide an electrical signal to said data collection computer means.

3. The instrumented data acquisition system of claim 2, wherein:
 (a) said driver side pitman arm measuring device is a continuous turn rotary potentiometer which may be engaged to the driver side pitman arm of the power steering system to measure driver side pitman arm rotation; and
 (b) said driver side pitman arm rotary potentiometer being functionally engaged to said data collection computer means to provide an electrical signal to said data collection computer means.

4. The instrumented data acquisition system of claim 3, wherein:
 (a) said passenger side wheel turn angle measuring device is a continuous rotary potentiometer which may be engaged to the passenger side wheel of the vehicle to measure wheel turn angle;
 (b) said driver side wheel turn angle measuring device is a continuous rotary potentiometer which may be engaged to the driver side wheel of the vehicle to measure wheel turn angle; and
 (c) said passenger side wheel rotary potentiometer and said driver side wheel rotary potentiometer are functionally engaged to said data collection computer means to provide electrical signals to said data collection computer means.

5. The instrumented data acquisition system of claim 4, further comprising:
 (a) a pressure transducer which may be engaged to the power steering fluid pump to measure outlet pressure;
 (b) a flow meter which may be engaged to the power steering fluid pump to measure system flow rate; and
 (c) said fluid pump pressure transducer and said fluid pump flow meter are functionally engaged to said data collection computer means to provide electrical signals to said data collection computer means.

6. The instrumented data acquisition system of claim 5, further comprising:
 (a) a thermocouple which may be engaged to the power steering reservoir for measuring liquid temperature in the power steering reservoir; and
 (b) said reservoir thermocouple is functionally engaged to said data collection computer means to provide an electrical signal to staid data collection computer means.

7. The instrumented data acquisition system of claim 6, further comprising:
 (a) a load cell which may be engaged to the steering wheel for measuring driver input to the steering wheel; and
 (b) said load cell is functionally engaged to said data collection computer means to provide an electrical signal to said data collection computer means.

8. The instrumented data acquisition system of claim 7, further comprising:
 (a) a transducer which may be engaged to the engine of the vehicle for measuring engine speed; and
 (b) said engine speed transducer is functionally engaged to said data collection computer means to provide an electrical signal to said data collection computer means.

9. The instrumented data acquisition system of claim 4, wherein said bracket pulley rotary potentiometer, said driver side pitman arm rotary potentiometer, said driver side wheel rotary potentiometer and the passenger side wheel rotary potentiometer are each more specifically a Spectrol Model 132-0-0-103 rotary potentiometer.

10. The instrumented data acquisition system of claim 3, wherein the power steering system is more specifically a dual-gear system with a slave power steering gear for controlling the passenger side wheel via a passenger side pitman arm and the slave power steering gear is engaged to the steering gear via a left side pressure line and a right side pressure line, further comprising:
 (a) a pressure transducer which may be engaged to the slave gear left side pressure line;
 (b) a pressure transducer which may be engaged to the slave gear right side pressure line;
 (c) a continuous turn rotary potentiometer which may be engaged to the passenger side pitman arm of the power steering system to measure passenger side pitman arm rotation; and
 (d) said passenger side pitman arm rotary potentiometer, said slave gear left side pressure transducer and said slave gear right side pressure transducer are functionally engaged to said data collection computer means to provide electrical signals to said data collection computer means.

11. The instrumented data acquisition system of claim 10, wherein said passenger side pitman arm rotary potentiometer is more specifically a Spectrol Model 132-0-0-103 rotary potentiometer.

12. A method of monitoring performance of a power steering system of a mobile vehicle with an engine and a frame which includes a driver side wheel and a passenger side wheel each mounted on wheel spindles pivotably mounted to opposite ends of an axle through king pins, a driver operated steering wheel connected to a steering gear through an intermediate steering shaft, a driver side pitman arm functionally engaged to the steering gear so as to pivotably rotate upon intermediate steering shaft rotation and connected to a drag link in turn pivotably connected to a steering arm secured to the driver side wheel spindle to control movement of the driver side wheel, and a power steering reservoir engaged to a power steering fluid pump for supplying fluid to the steering gear, comprising the steps of:
 (a) installing an instrumented data acquisition system, comprising the steps of:
  (i) installing a steering wheel rotation measuring assembly;
  (ii) installing a driver side pitman arm angle measuring device;
  (iii) installing a passenger side wheel turn angle measuring device;
  (iv) installing a driver side wheel turn angle measuring device; and
  (v) engaging a data collection computer means for collecting input data from and displaying output data for said steering wheel rotation measuring assembly, said driver side pitman arm angle measuring device, said passenger side wheel turn angle measuring device, and said driver side wheel turn angle measuring device;
 (b) measuring said input data with said data collection computer means; and
 (c) analyzing output data from said data collection computer means.

13. The method of monitoring performance of a power steering system of claim 12, wherein said steering wheel rotation measuring assembly is comprised of:

(a) a shaft pulley which may be engaged around the intermediate steering shaft;

(b) a bracket pulley of equal outer diameter as said shaft pulley and which may be mounted via a bracket to the frame of the vehicle;

(c) a timing belt which may be attached around said shaft pulley and said bracket pulley such that one rotation of the intermediate steering shaft results in one turn of said bracket pulley;

(d) a continuous turn rotary potentiometer engaged to said bracket pulley such that one turn of said bracket pulley results in one turn of said rotary potentiometer; and (e) said bracket pulley rotary potentiometer is functionally engaged to said data collection computer means to provide an electrical signal to said data collection computer means.

14. The method of monitoring performance of a power steering system of claim 13, wherein:

(a) said driver side pitman arm measuring device is a continuous turn rotary potentiometer which may be engaged to the driver side pitman arm of the power steering system to measure driver side pitman arm rotation; and (b) said driver side pitman arm rotary potentiometer is functionally engaged to said data collection computer means to provide an electrical signal to said data collection computer means.

15. The method of monitoring performance of a power steering system of claim 14, wherein:

(a) said passenger side wheel turn angle measuring device is a continuous rotary potentiometer which may be engaged to the passenger side wheel of the vehicle to measure wheel turn angle;

(b) said driver side wheel turn angle measuring device is a continuous rotary potentiometer which may be engaged to the driver side wheel of the vehicle to measure wheel turn angle; and (c) said passenger side wheel rotary potentiometer and said driver side wheel rotary potentiometer are functionally engaged to said data collection computer means to provide electrical signals to said data collection computer means.

16. The method of monitoring performance of a power steering system of claim 15, wherein said step for installing said instrumented data acquisition system is further comprised of the steps of:

(vi) installing a pressure transducer to the power steering fluid pump to measure pump outlet pressure;

(vii) installing a flow meter to an outlet of the power steering fluid pump to measure system flow rate;

(viii) installing a thermocouple to the power steering reservoir to measure liquid temperature;

(ix) installing a load cell to the steering wheel for measuring driver input to the steering wheel;

(x) installing an engine speed transducer to the engine of the vehicle to measure engine speed; and (xi) engaging said data collection computer means to collect input data from said fluid pump pressure transducer, said fluid pump flow meter, said reservoir thermocouple, said load cell, and said engine speed transducer.

* * * * *